Figure 1:
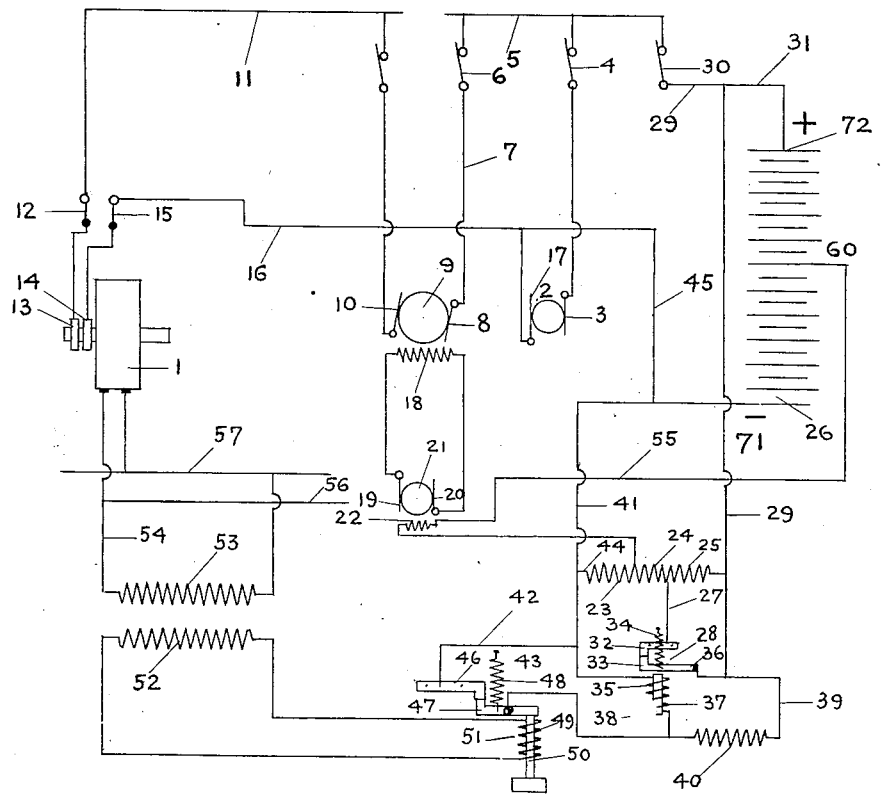

F. E. RICKETTS.
ELECTRIC REGULATOR.
APPLICATION FILED NOV. 13, 1907.
1,125,717.
Patented Jan. 19, 1915.
2 SHEETS—SHEET 2.
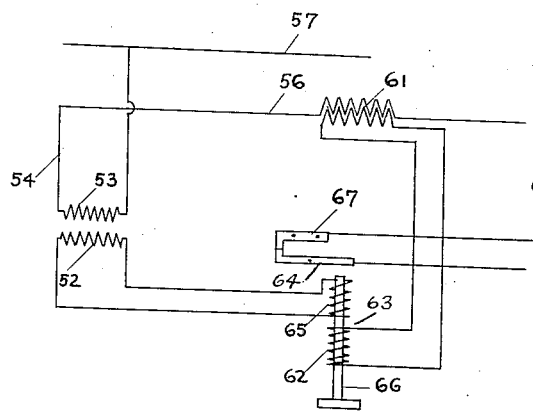
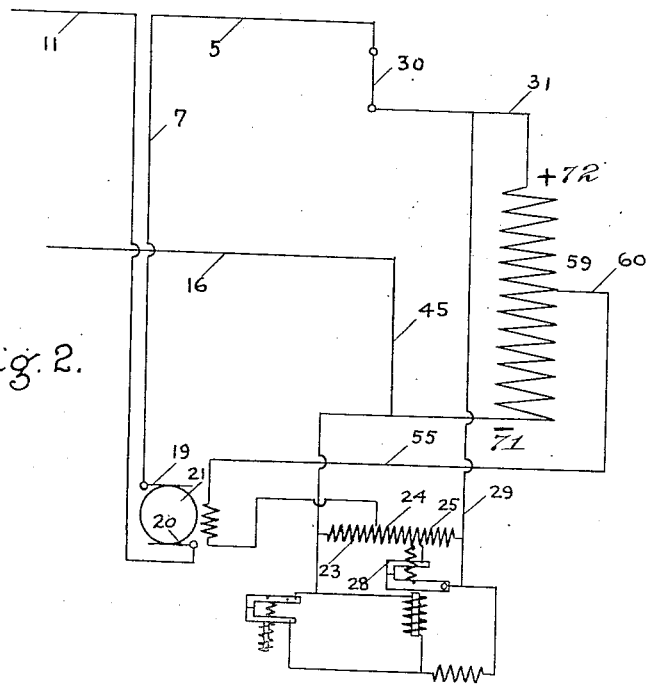
Witnesses:
Inventor:
FORREST E. RICKETTS
BY
Stewart & Stewart
Attorneys.

UNITED STATES PATENT OFFICE.

FORREST E. RICKETTS, OF DERWOOD, MARYLAND, ASSIGNOR OF ONE-HALF TO PIERRE O. KEILHOLTZ, OF BALTIMORE, MARYLAND.

ELECTRIC REGULATOR.

1,125,717.  Specification of Letters Patent.  Patented Jan. 19, 1915.

Application filed November 13, 1907. Serial No. 401,951.

*To all whom it may concern:*

Be it known that I, FORREST E. RICKETTS, citizen of the United States of America, residing at Derwood, county of Montgomery, State of Maryland, have invented certain new and useful Improvements in Electric Regulators, of which the following is a specification.

The present invention relates to electric regulators and contemplates the provision of such a regulator adapted to maintain the current or voltage of a circuit substantially constant and to compensate for variations of the load and of the power generated.

In accordance with my invention, regulation is accomplished by means of a source of electricity or regulating generator placed in the field circuit of the main generator and provided with means for reversing its potential, whereby its potential coincides in direction with or opposes that of the generator field circuit, in the first instance increasing and in the second decreasing the field strength. The direction of the potential of the regulating generator is controlled by means of its field, the current in which is reversed in response to variations of conditions in the armature circuit of the main generator, i. e., the work circuit to be regulated. In other words, the regulating generator increases or decreases the normal field excitation of the main generator in accordance with the variation in load and power on the system to be regulated. The means by which the field current of the booster is controlled, is to be hereinafter described, and forms an important feature of my invention.

Figure 1 is a diagram showing a generator and a portion of a circuit and means for controlling the condition of the circuit in accordance with my invention. Fig. 2 illustrates an application of my invention in which a resistance is substituted for the battery shown in Fig. 1. Fig. 3 illustrates diagrammatically a modification of my invention whereby the voltage is regulated at some predetermined distant point of the circuit.

The generator (1) to which power is applied from any convenient source, is shown as provided with a rotating field and a fixed armature. The field current is furnished by means of a suitable source of electricity. In the system illustrated a dynamo (2), known as an exciter, supplemented by a battery 26 to be later described, furnishes the field current. The positive pole (3) of the exciter is connected through a switch (4) with the positive exciter main (5). A switch (6) and conductor (7) connect the positive exciter main with one terminal (8) of a source of electricity (9) herein shown as a dynamo of less capacity than the exciter. It will be observed that this arrangement corresponds to the ordinary generator exciter commonly employed with the exception that there is placed in series with the exciter the regulating generator 9. The other terminal (10) of the booster (9) is connected by means of a suitable conductor and a switch with the positive field main (11), which in turn is connected through switch (12) to positive terminal (13) of the field magnet of the main generator. The negative terminal (14) of the field magnet is connected through switch (15) to negative exciter main (16), which in turn is connected to the negative terminal (17) of the exciter. The regulating generator (9) is provided with a stationary field magnet (18), the terminals of which are connected to the terminals (19) and (20) of a suitable source 21 of excitation potential, herein shown as a dynamo, the armature circuit of which excites the field of the regulating generator 9. The exciter 21 is provided with a stationary field (22), which, as hereinafter described, is shunted to the main exciter circuit, being connected to the positive and to the negative exciter mains. Placed in circuit with this field are a set of resistance members, (23, 24 and 25) and a storage battery (26).

In the embodiment of my invention shown the resistance of the member (24) is less than that of the member (23), but the sum of the resistances of the adjacent members (24 and 25) is greater than the resistance of the member (23). One terminal of the field (22) is connected to the adjacent terminals of the members (23 and 24). A suitable conductor (27) leads from the adjacent terminals of the resistance (24 and 25) to the automatic switch (28). From the positive exciter main a conductor (29) in which is inserted a switch (30) leads to the automatic switch (28). Intermediate the switch (30) and the automatic switch (28) a conductor (31) leads to the positive terminal (72) of the battery (26), which is in parallel with the exciter.

Intermediate the conductor (31) and the automatic switch (28) the conductor (29) is connected to the terminal of the resistance (25), remote from the resistance members (23 and 24). The switch (28) may be of any well known type. The one herein shown has a fixed contact (32) and a contact (33) which consists of a soft iron lever mounted to swing about a center (36). A spring (34) normally holds the lever (33) in position to make electrical connection with the fixed member (32). An electromagnet (37) having a soft iron core (38) serves when placed in circuit to separate the contact members (32 and 33), the soft iron lever (33) being attracted as an armature to the core (38) of the magnet against the tension of the spring. When the switch (28) is closed, connection is established from the positive exciter main and the positive pole of the battery through the conductor (29) and the switch (28), the resistance (24), the field (22) and the conductor (55) to the intermediate terminal (60) of the battery, through the battery to the negative terminal (71) and to the negative main by conductor (45).

From a point of the conductor (29) near the switch (28) a shunt (39) having therein a resistance (40) leads to one terminal of the coil (35) of the electromagnet (37). The other terminal of the magnet is connected by means of a conductor (41) to the negative terminal (71) of the battery (26). Normally a current passes from the positive exciter main (5) or the positive pole of the battery (26) depending on the relative potentials of these two members, through the conductor (29) to the conductor (39) through the resistance (40) and the magnet (37) and back to the negative terminal of the battery and the negative exciter main. The function of the resistance (40) is to reduce the flow through the shunt (39) to the magnet, so that it is normally very slight. Between the magnet (37) and the battery (26) three connections are made to the conductor (41). The first (42) leads to an automatic switch (43) to be later described; the second (44) leads to the terminal of the resistance (23) remote from the resistance (24). The third (45) leads to the negative main of the generator field, connecting the negative pole of the battery to the negative exciter main. The conductor (39) is connected beyond the terminal of the magnet to switch (43) adapted to open and close connection between the conductors (39 and 42) forming a low resistance by pass for the current, which when the switch is open, must pass through the magnet (37).

The switch (43) consists of a stationary contact (46) and a movable contact (47). The latter is a lever pivotally mounted, normally maintained by a spring (48) in position to establish electrical connection with the contact (46). An electromagnet (49) is placed adjacent one arm of the lever (47) and provided with a soft iron core (50) resting normally on a suitable support. When sufficient current is passed through the magnet coil (51) the core is lifted and rotates the lever against the tension of the spring and opens the connection at the switch. The current by which the electromagnet (49) is excited is derived from the secondary (52) of the transformer, the terminals of which are connected to the corresponding terminals of the magnet coil. The primary coil (53) by which current is induced in the secondary coil (52) forms a shunt to the armature circuit of the generator, being connected at one end to one main (56) of the generator, and at the other end to the other main (57). An alternating current generator is employed in the embodiment shown. When the system is in operation a current tends to flow along the conductor (29) from the positive exciter main, or if the exciter is not running at normal capacity from the battery (26) to the switch (28), to the resistance member (24), thence to the field coil (22) of the exciter, and from the coil along the conductor (55) to an intermediate terminal (60) of the battery (26). This tendency is known as an electromotive force. An opposite electromotive force also exists tending to establish a current from the intermediate terminal (60) through the field coil (22) to the resistance 23, and through the resistance to the negative pole of the battery. The battery (26) is so divided by the intermediate terminal (60) and the resistances 23 and 24 are so proportioned that the electromotive force first indicated is the greater, and a current flows along the path defined in connection with that electromotive force. The current in the field (22) of the exciter 21 under these conditions is in a direction tending to increase the strength of the main generator field and will be hereinafter termed positive. Currents passing in the opposite direction through the exciter field will be termed negative.

In response to an increase of potential or voltage in the armature circuit of the generator the current in the shunt (54) and coil (53) increases, inducing a greater current in the secondary coil (52) whereby the force which impels the armature (50) of the magnet (49) toward its position of equilibrium is increased and overcomes the tension of the spring (48) breaking contact at the switch (43).

The resistance of the switch (43) and the conductor (42) is, as is stated above, less than the resistance of the magnet (37), and while the switch is closed it furnishes a by-pass or short circuit for the current, which on the opening of the switch is directed through the magnet. The increase of the current through the magnet (37) increases the attraction between the fixed core (38) and the armature (33) whereby the tension of the spring (34) is overcome, and the switch (28) opens. Thereby the current, which was described as passing from the conductor (29) to the resistance (24) to the field of exciter 21 and through the field to the intermediate point (60) of the battery is interrupted. Opening the switch (28) breaks the short circuit by which the current was shunted around the resistance (25) so that this resistance is thrown into the circuit of the positive current. The resistance thus opposed to the positive electromotive force so reduces its tendency to establish a current that it is overcome by the opposite electromotive force, and a negative current through the field (22) is established, the path being from the intermediate point (60) of the battery to which the conductor (55) is connected through the field of exciter (21) to the resistance (23) and by way of the conductor (41) to the negative terminal of the battery (26) or to the negative main (45). When the voltage drops through the desired mean, the switch (43) is immediately closed by reduction of the current in the shunt (54) and of the attraction of the magnet (49). This closes the circuit in the shunt (42, 39) whereby the current in the magnet (37) is reduced and the switch (28) is closed. The volume of the current takes the easiest path, by way of conductors (29, 27) resistance (24) and through the field magnet (22) of the generator (21); the current of the latter is reversed and becomes positive. Thus we have two opposite electromotive forces, each tending to establish a current through the field of generator (21) in a direction opposed to the other, and means for varying continually the resistance to be overcome by one electromotive force by a fixed amount whereby a current is caused to flow through the generator field first in one direction and then in the other direction. The result of this is that the potential of the generator (21) is reversed by variations through normal of the voltage to be regulated and is thus opposed to the variation of potential in the main circuit which it is desired to counterbalance, and a variation of potential in the main circuit opposite to that which first occurred is produced. When the electromotive force which the generator 21 throws into the main circuit (acting in the arrangement disclosed in Fig. 1 through the regulating generator (9) and in the arrangement shown in Fig. 2 directly upon the field circuit of the main generator) has varied the voltage of the work circuit through the predetermined mean, the reversing device acts and the operation of governing is repeated.

As the change of electromotive force produced by the exciter (21), if its potential is allowed to act continuously in one direction, is greater than any variation of the electric condition of the main circuit which is likely to occur, the potential of the said exciter is continuously reversed at slightly varying periods, the summation of these applications of potential in opposite directions serving to effect the desired regulation by reason of the fact that the duration of the impulses in that direction which oppose the variation of potential in the main circuit, is, by the automatic operation of the regulator, greater than the duration of the impulses in the opposite direction.

In this connection, it will be noted that my regulator has no neutral position, and that the regulating generator is always in circuit, the direction of its electromotive force being such as either to increase or decrease the potential of the main generator.

When the generator capacity is large and requires a large field current, the regulating generator (9), the field of which is placed in series with the armature of the exciter (21) is employed, though in the case of a generator operating with a current of less magnitude the generator (21) may itself become the regulating generator, as in Fig. 2.

In the embodiment of my invention as illustrated in Fig. 2 a resistance member (59) is substituted for the battery (26). The conductor (55) is connected to the resistance member at (60) intermediate of its plus and minus terminals (72) and (71) as when the battery is employed. The operation of my regulator is the same under these conditions as it is with the use of a battery, so that when once installed the regulator may be used either with the resistance or with a battery.

Another modification of my invention is illustrated in Fig. 3, which shows a transformer (61) in the main of the generator armature at a point preferably near the generator. This coil is connected to a transformer secondary (62) of the magnet 63 adapted to actuate a switch (64) similar to the switch (43) Fig. 1. Another coil (65) excited by the generator main in a manner similar to that of coil (51), previously described, encircles the magnet. The two coils are opposed, that is, so placed as to tend to move the core in opposite directions. The coil (62) as above described, is adapted to carry a current varying with the number of amperes passing through the generator circuit, and coil (65) carries a current varying with the voltage as previously set forth in regard to coil (51) Fig. 1.

It is apparent that the operation of the switch (64) to reverse the potential of the exciter (21) in response to an increase of voltage above the predetermined mean is retarded by the action of the coil (62). As the attraction of this coil varies as the current, increase of current causes the regulator to act at increased voltage, so the greater the current the higher the voltage maintained at the armature. By making the coils (62-65) of the requisite relative strength it is apparent that the regulator can be made to act in response to increase or decrease of voltage at any point in the circuit, and therefore to regulate the voltage at that point.

The regulator as herein described operates without attention to maintain the voltage at any point of the circuit, to which it is connected, substantially constant within the narrowest limits.

Although my regulator has been shown and described as a voltage regulator, it is evident to those skilled in the art that it may be applied to a current regulator, and such application is within the scope of my invention.

What I claim is:

1. In an electrical system of distribution, a generator, a load-carrying circuit fed therefrom, a regulator including an independent generator controlling the excitation of the main generator, and means under the influence of the load-carrying circuit for continually reversing the potential of such independent generator and thereby compensating for variations in the electrical condition of the system.

2. In an electrical system of distribution, a generator, a load-carrying circuit fed therefrom, a regulator including an independent generator controlling the excitation of the main generator and having a field magnet with an exciting coil, means for establishing opposite electromotive forces tending to produce opposite currents through said exciting coil, and means under the influence of the load-carrying circuit for varying continually the said electromotive forces, whereby one becomes alternately greater and less than the other reversing the current in said coil, the relative duration of the currents corresponding to the extent of the variations in the electrical condition of the system.

3. In an electrical system of distribution, a generator, a load-carrying circuit fed therefrom, a regulator including an independent source of regulating potential continuously in circuit and controlling the excitation of the main generator, and means under the influence of the load-carrying circuit for reversing the direction of the current tendency of such regulating potential continually, at varying periods, the length of the periods corresponding to the extent of the variations in the electrical condition of the system.

4. The combination with a main generator and means for exciting the same, of a voltage regulator including means for generating electric potential associated with the circuit of the exciting means of the main generator, and means controlled by the variation of the voltage of the main generator through a predetermined mean for continually reversing the generating means, whereby it is made to compensate for each such variations.

5. In an electric system, the combination with a main generator, and means for exciting the same, of a dynamo associated therewith and means responsive to the electrical condition of the system for continually reversing the field current of the dynamo, whereby its armature potential is reversed, to compensate for each variation through normal of the electrical condition of the system.

6. In an electric system in combination, a main generator, and means for exciting the same, an independent generator associated with the exciting circuit of the main generator and having a field magnet with an exciting coil, means for establishing opposite electromotive forces adapted to produce opposite currents through the exciting coil of the independent generator, and means for continually varying relatively the electromotive forces.

7. In combination with a main generator, a voltage regulator comprising an independent generator associated with the excitation system of the main generator and having a field magnet with a coil, means for establishing opposite electromotive forces in the coil, and means for varying continually by a fixed amount the electromotive forces, whereby current is passed through the field coil first in one direction and then in the other.

8. In an electric excitation system for a main generator, in combination, a regulating generator having a field magnet with a coil, means for establishing opposite electromotive forces in the coil and a switch coöperating with the said means for changing one of the electromotive forces to reverse the direction of the resultant electromotive force and of the current in the coil at each operation of the switch.

9. Means for compensating for variations from a predetermined mean of the electrical conditions of a circuit to be regulated, including an inductive regulating circuit, a generator having its armature in said inductive circuit, an exciting coil for the field magnet of said generator, a plurality of sources of electric potential connected with the coil establishing opposite electromotive forces in the coil, a resistance in circuit with the coil, a switch, and means for operating the switch, the said operating means being actuated by the variations from the predetermined mean of the electrical conditions of the circuit to be regulated to short-circuit part of said resistance, reversing the direction of the resultant electromotive force in the coil and the potential of the said generator at each operation of the switch.

10. In combination with the excitation circuit of a main generator, a voltage regulator including an independent generator and its field coil, a battery connected at three points to the field coil, establishing opposite electromotive forces therein, a resistance member in circuit with the field coil, and means for varying the resistance member continually by a predetermined amount, so that the direction of the current in the field coil is reversed at each such change.

11. In combination with an excitation circuit, a voltage regulator including a generator and its field coil, a battery, connections between the field coil and one point of the battery, a resistance member, connections between other points of the battery and the field coil through the resistance, and means for continually varying the resistance member, thereby reversing the current in the coil at each change of the resistance member.

12. In combination with an excitation circuit, a voltage regulator including a generator and its field coil, a battery, connections between an intermediate point of the battery and one end of the field coil, and means for continually shifting the effective connection of the other end of the field coil from one to the other terminal point of the battery whereby the resultant current is continually reversed.

13. In an electric system, a generator having an excitation system, an independent generator, the armature of which is associated with the excitation system, a field coil for the independent generator, a battery having three terminals, each of which is at a different potential and connected to the coil, a resistance member between two terminals and the coil, and means for short-circuiting a part of the resistance member on a predetermined variation from normal of the electrical condition of the system to be regulated, reversing the field current of the independent generator.

14. In combination with a generator having an excitation system, an independent generator, the armature of which is associated with the excitation system, a field coil for the independent generator, a battery having a plurality of terminals, each of which is at a different potential and connected to the coil, a resistance member between one terminal of the battery and the coil and means, consisting of suitable connections and an automatic switch, for short-circuiting the resistance member.

15. Means for regulating the condition in an electric circuit consisting of a main generator and means for exciting the same, an independent generator associated with the circuit of the generator field, a field coil for the independent generator, a source of electromotive force having three terminals, each of which is at a different potential and connected to the coil, a resistance member between two terminals of the source of electromotive force and the coil, a switch for short-circuiting a part of the resistance member and means controlled by the condition in the circuit to be regulated for operating the switch, reversing continually the current of the independent generator field.

16. In combination with a generator having an excitation system, means for controlling the electrical condition of the circuit consisting of a regulating generator associated with said excitation system, a field coil for the regulating generator, connections to the field coil of the regulating generator, including sources of opposite electromotive forces, a resistance member in such connections and a switch for short-circuiting the resistance member, a magnet for throwing the switch to reverse the regulating generator, and a shunt about the magnet including a second switch controlled by variations of the electrical condition to be regulated to short-circuit the magnet.

17. Means for compensating for variations from a predetermined mean of the voltage of a circuit to be regulated, including a generator having an armature, a field coil, suitable connections to the said field coil of the generator, including sources of opposite electromotive forces, a resistance member in such field coil connections sufficient to determine the direction of the resultant current in the coil, and means for short-circuiting the resistance member, consisting of a switch and means controlled by variations from the predetermined mean of the voltage of the circuit to be regulated for operating the switch continually to compensate for such variations.

18. In an electric system, a generator, an exciter therefor and a regulating generator having an armature associated with the circuit of the main generator field, a field coil for said regulating generator, a battery in parallel with the exciter and having three terminals, each at a different potential, and each connected to the said field coil, a resistance in circuit with the field coil, and means controlled by the condition of the system to be regulated for changing the resistance of the connection between the said field coil and one terminal of the battery to continually reverse the current of the field of the regulating generator.

19. In an electric load-carrying system, a main generator with an exciting system containing in series a fixed source of normal excitation potential corresponding to the normal demand of the system and a variable source of auxiliary excitation potential, and means for varying and reversing the variable auxiliary source in response to variations of load or power.

20. In an electric load-carrying system, a main generator having a source of excitation potential and a regulating generator in series therewith, an exciting generator exciting the field of the regulating generator, and means for continually reversing the field current of the said exciting generator.

21. In an electric load-carrying system, a main generator having a source of excitation potential and a regulating generator in series therewith, an exciting generator exciting the field of the regulating generator and means for continually reversing the field current of the said exciting generator, said reversing means being responsive to the potential of the system to be regulated.

22. In an electric system, the combination with a main generator and means for exciting the same, a voltage regulator including a regulating generator controlling the exciting means of the main generator, an exciting winding for the said regulating generator, means for applying to said winding opposed electromotive forces, and means for continuously varying one of said electromotive forces by fixed amounts at varying periods, the length of the periods corresponding to the extent of the variations in the potential of the system to be regulated.

23. In an electric system, the combination with a main generator and means for exciting the same, a voltage regulator including a regulating generator controlling the exciting means of the main generator, means for continuously reversing the magnetic flux of the regulating generator, and means responsive to voltage conditions of said system for determining the periodicity of said reversals.

Signed by me at Baltimore, Maryland, this 11th day of November 1907.

FORREST E. RICKETTS.

Witnesses:
 EDWARD L. BASH,
 S. RALPH WARNKEN.